United States Patent
Sébire

(10) Patent No.: US 8,934,449 B2
(45) Date of Patent: Jan. 13, 2015

(54) NEIGHBORING CELL SIGNAL MEASUREMENT AND REPORTING

(75) Inventor: Guillaume Sébire, Espoo (FR)

(73) Assignee: Nokia Corporation, Espoo (FI)

( * ) Notice: Subject to any disclaimer, the term of this patent is extended or adjusted under 35 U.S.C. 154(b) by 1207 days.

(21) Appl. No.: 12/428,952

(22) Filed: Apr. 23, 2009

(65) Prior Publication Data

US 2009/0268690 A1    Oct. 29, 2009

Related U.S. Application Data

(60) Provisional application No. 61/047,664, filed on Apr. 24, 2008.

(51) Int. Cl.
*H04W 4/00* (2009.01)
*H04W 48/10* (2009.01)
*H04W 88/06* (2009.01)

(52) U.S. Cl.
CPC .............. *H04W 48/10* (2013.01); *H04W 88/06* (2013.01)
USPC ........................................... 370/331; 370/328

(58) Field of Classification Search
USPC .................................................. 370/331, 328
See application file for complete search history.

(56) References Cited

U.S. PATENT DOCUMENTS

| | | | |
|---|---|---|---|
| 2003/0026235 A1* | 2/2003 | Vayanos et al. | 370/342 |
| 2004/0092259 A1* | 5/2004 | Blanc et al. | 455/432.1 |
| 2005/0239471 A1* | 10/2005 | Babovic | 455/452.2 |
| 2005/0288019 A1 | 12/2005 | Park et al. | |
| 2007/0224988 A1* | 9/2007 | Shaheen | 455/436 |
| 2007/0224990 A1* | 9/2007 | Edge et al. | 455/436 |
| 2007/0281696 A1* | 12/2007 | Vikberg et al. | 455/436 |
| 2008/0176564 A1* | 7/2008 | Eerolainen | 455/436 |

FOREIGN PATENT DOCUMENTS

| | | |
|---|---|---|
| CN | 1261510 A | 7/2000 |
| EP | 1246499 A1 | 10/2002 |
| EP | 1986372 A1 | 10/2008 |
| WO | 96/33588 A1 | 10/1996 |
| WO | 2009/130688 A1 | 10/2009 |

OTHER PUBLICATIONS

Vodafone, "GSM NCL broadcast in E-UTRAN", 3GPP Workshop, Agenda Item 4.2 (Sep. 27-28, 2007), 2 pages.

(Continued)

*Primary Examiner* — Noel Beharry
*Assistant Examiner* — Kodzovi Acolatse
(74) *Attorney, Agent, or Firm* — Squire Patton Boggs (US) LLP

(57) ABSTRACT

Example embodiments of methods and apparatus for neighboring cell signal measurement and reporting are disclosed. An example method includes operating a first wireless communication cell in accordance with a first radio access technology (RAT). The example method further includes transmitting, to one or more mobile devices in the first wireless communication cell, information regarding one or more neighboring wireless communication cells. The one or more neighboring wireless communication cells are operated in accordance with a second RAT. The example method also includes establishing an active communication channel in the first wireless communication cell with a mobile device of the one or more mobile devices. The example method still further includes receiving capability information of the mobile device, the capability information including an indication if the mobile device is compatible with the second RAT. The example method additionally includes, in the event the mobile device is compatible with the second RAT, providing instructions to the mobile device regarding whether or not to provide measurement reports for signals received from the one or more neighboring cells.

18 Claims, 6 Drawing Sheets

(56) References Cited

OTHER PUBLICATIONS

International Search Report and Written Opinion of Application No. PCT/IB2009/051701, mailed Sep. 23, 2009, 14 pages.

"3GPP TS 25,214 V7.3.0: 3rd Generation Partnership Project; Technical Specification Group Radio Access Network; Physical Layer Procedures (FDD) Release 7", (Dec. 2006),1-60.

Kolding, T. E., et al., "Low-Bandwith Channel Quality Indication for OFDMA Frequency Domain Packet Scheduling", Nokia Networks, Aalborg University, Denmark, (Sep. 2006),1-5.

Ekstrom, Hannes et al., "Technical Solutions for the 3G Long-Term Evolution", Communications Magazine, IEEE, vol. 44, Issue: 3, (Mar. 2006),1-8.

Office Action dated Mar. 26, 2013 for corresponding Indonesian Patent Application No. W00201003676 with English language translation.

First Office Action dated Aug. 22, 2014, issued in corresponding Chinese Application No. 200980114241.6, 15 pages.

* cited by examiner

NEIGHBORING CELL SIGNAL MEASUREMENT AND REPORTING

CROSS REFERENCE TO RELATED APPLICATIONS

This application claims priority based on U.S. Provisional Application No. 61/047,664, filed on Apr. 24, 2008, entitled, "Neighboring Cell Signal Measurement and Reporting," the disclosure of which is hereby incorporated by reference.

TECHNICAL FIELD

This description relates to wireless networks.

BACKGROUND

The use of wireless networks for mobile communication (e.g., voice and/or data communication) continues to grow at a rapid pace. Part of that growth is a desire for increased network capacity and improved quality of service for users of such wireless networks. Such increased network capacity and improved quality of service may be achieved, at least in part, by increasing available bandwidth of wireless networks. Increases in bandwidth may allow for increased use and/or improved quality of service for network users.

Advancements in wireless network technology are being continually investigated in order to keep pace with increasing use and quality of service expectations. For instance, the Third Generation Partnership Project (3GPP) is currently developing standards for an Evolved Universal Mobile Telecommunications System (UMTS) Terrestrial Radio Access Network (E-UTRAN), which is, in part, an evolvement of UMTS. The E-UTRAN standards are also referred to as the Long Term Evolution (LTE) standards or the Evolved UMTS Terrestrial Radio Access (E-UTRA) standards. UMTS, in turn was evolved, in part, from the Global System for Mobile Communications (GSM).

In the following, the term GSM applies to all GSM-based systems such as GSM itself, General Packet Radio Service (GPRS), Enhanced Data rates for Global Evolution (EDGE), and any evolution thereof, the term UMTS applies to all UMTS-based systems such as UMTS itself, High Speed Downlink Packet Access (HSDPA), and any evolution thereof, the term LTE (E-UTRA, E-UTRAN) refers to all LTE-based systems and any evolution thereof.

When new wireless network technologies are introduced (as will be the case with E-UTRAN (LTE)), the new technologies are typically deployed in conjunction with existing technologies, thus creating multi-mode networks (e.g., networks implementing multiple wireless communication standards simultaneously). Such an approach allows for the investment in new technologies to be made over time, as well as allowing for continued use of investments made in previous technologies. Thus, it is foreseeable that multi-mode wireless networks including GSM, UMTS and E-UTRAN coverage will exist.

One consideration that is taken into account when deploying new technologies along with existing technologies in a multi-mode network is the interworking between the new technology and the existing technology, or technologies. Interworking is needed so that wireless network users are able to move between wireless coverage of existing technologies and wireless coverage of new technologies while maintaining continuity of service as far as possible. In such a situation, a mobile device that is being used would be compatible with both the existing technologies, as well as the new technology, e.g., a multi-mode mobile device that is compatible with GSM and LTE.

One aspect of interworking for wireless telecommunication networks is how to handle the process of handing over (handing off) mobile devices from wireless communication cells (e.g., such as defined by a base station) of one technology to communication cells of another technology. Such handoffs may occur when the mobile device is actively communicating in the multi-mode network (e.g., engaged in a voice or data call) or, alternatively, may occur when the mobile device is operating in an idle mode in the multi-mode network (e.g., connected with the network but not actively communicating).

In order to facilitate such hand overs, a mobile device receives information regarding one or more neighboring cells from a base station of its current cell. The mobile device then makes signal measurements (e.g., signal strength measurements) for signals received from the neighboring cells and provides measurement reports including, or based on, the signal measurements to its current base station. Based on the signal measurements and/or the measurement reports, the mobile device may initiate hand over to a neighboring cell (e.g., with better signal quality than its current cell) or the mobile device's current base station may initiate hand over to a neighboring cell. Such signal measurement and handing over may occur when the mobile device is actively communicating or while the mobile device is operating in idle mode (e.g., connected to the network but not communicating via an active communication channel). For the mobile device to report measurements, there must be an active communication channel established, even if only to provide a measurement report.

As is known, mobile devices, e.g., in GSM and UMTS, use a control channel of their current cell's base station to provide measurement reports for the signals. Typically, such control channels have limited bandwidth. A mobile device operating in a multi-mode network makes signal measurements and provides measurements reports for neighboring cells of each technology with which it is compatible. For instance, a tri-mode phone (e.g., compatible with GSM, UMTS and LTE) will make signal measurements and provide measurement reports for neighboring GSM cells, neighboring UMTS cells and neighboring LTE cells if such neighboring cells are indicated by the multi-mode network.

Due to differences in wireless technologies (e.g., differences between existing technologies and new technologies) facilities for executing hand overs in some circumstances may not be available or, alternatively, may be limited. For instance, while GSM and UMTS provide for circuit-switched only connections (e.g., for voice traffic), LTE will be implemented as a packet-switched only network. Therefore, facilities for hand over of GSM and/or UMTS circuit-switched connections (i.e., dedicated mode, radio resource connections) to LTE packet-switched connections in LTE cells may not be available, or may be limited.

In such situations, i.e., where hand over facilities are either not available or are limited, performing signal measurements and measurement reporting for all signals received from neighboring cells to which hand over is not available or limited has some drawbacks. First, performing such signal measurements consumes battery charge for the mobile device performing the measurements. Second, making such measurements reduces the time available to make other signal measurements, such as for cells where hand over is possible or is not limited. Third, providing measurement reports for such signal measurements reduces the already limited bandwidth available in a control channel (e.g., for an associated base station) for reporting the other signal measurements (e.g., for cells where handover is possible or not limited).

SUMMARY

In an example embodiment, a method includes operating a first wireless communication cell in accordance with a first radio access technology (RAT). The method further includes transmitting, to one or more mobile devices in the first wireless communication cell, information regarding one or more neighboring wireless communication cells, where the one or more neighboring wireless communication cells are operated in accordance with a second RAT. The method additionally includes establishing an active communication channel in the first wireless communication cell with a mobile device of the one or more mobile devices. The method still further includes receiving capability information of the mobile device, the capability information including an indication if the mobile device is compatible with the second RAT. The method also includes, in the event the mobile device is compatible with the second RAT, providing instructions to the mobile device regarding whether or not to provide measurement reports for signals received from the one or more neighboring cells.

In another example embodiment, a method includes operating a mobile device in a first wireless communications cell, the first wireless communication cell operating in accordance with a first radio access technology (RAT). The method further includes receiving, at the mobile device, information regarding one or mode neighboring wireless communication cells operating in accordance with a second RAT. The method still further includes establishing an active communication channel with a base station in the first wireless communication cell. The method also includes providing capability information of the mobile device to the base station, the capability information including an indication if the mobile device is compatible with the second RAT. The method additionally includes, in the event the mobile device is compatible with the second RAT, receiving, from the base station, instructions regarding whether or not to provide measurement reports for signals received at the mobile device from the one or more neighboring wireless communications cells.

In yet another example embodiment, an apparatus for wireless communication includes a controller and a wireless transceiver coupled with the controller. In the apparatus, the controller and wireless transceiver are collectively configured to operate a first wireless communication cell in accordance with a first RAT. The controller and wireless transceiver are further collectively configured to transmit, to one or more mobile devices in the first wireless communication cell, information regarding one or more neighboring wireless communication cells. The one or more neighboring wireless communication cells are operated in accordance with a second RAT. The controller and wireless transceiver are still further collectively configured to establish an active communication channel in the first wireless communication cell with a mobile device of the one or more mobile devices. The controller and wireless transceiver are additionally collectively configured to receive capability information of the mobile device, the capability information including an indication if the mobile device is compatible with the second RAT. The controller and wireless transceiver are also collectively configured to, in the event the mobile device is compatible with the second RAT, provide instructions to the mobile device regarding whether or not to provide measurement reports for signals received from the one or more neighboring cells.

In still yet another example embodiment, an apparatus for wireless communication includes a controller and a wireless transceiver coupled with the controller. In the apparatus, the controller and the wireless transceiver are collectively configured to operate the apparatus as a mobile device in a first wireless communications cell, the first wireless communications cell operating in accordance with a first RAT. The controller and wireless transceiver are further collectively configured to receive information regarding one or mode neighboring wireless communication cells operating in accordance with a second RAT. The controller and wireless transceiver are still further collectively configured to establish an active communication channel with a base station in the first wireless communication cell. The controller and wireless transceiver are additionally collectively configured to provide capability information of the mobile device to the base station, the capability information including an indication if the mobile device is compatible with the second RAT. The controller and wireless transceiver are also collectively configured to, in the event the mobile device is compatible with the second RAT, receive, from the base station, instructions regarding whether or not to provide measurement reports for signals received at the mobile device from the one or more neighboring wireless communications cells.

DETAILED DESCRIPTION

The example embodiments described herein are given by way of example. The particular arrangements of these example embodiments are merely illustrative and other arrangements are possible. For instance, the various apparatus (including wireless networks) described and illustrated herein may include only a portion of the elements shown and described, may include additional elements or may eliminate some elements while adding others. Further, for the methods describe herein, operations may be eliminated and/or added. Also, the operations described with respect to the example methods may be performed in any appropriate order depending on the particular embodiment. Also, while the embodiments described herein are discussed in the context of Global System for Mobile communications (GSM), Universal Mobile Telecommunications Systems (UMTS) and Evolved UMTS Terrestrial Radio Access Network (E-UTRAN) (also referred to as Long Term Evolution (LTE)) multi-mode networks, the concepts described herein may apply equally to any number of other multi-mode (mixed-mode) wireless networks including e.g. other CDMA systems, WiMAX systems, etc.

Figure 1:
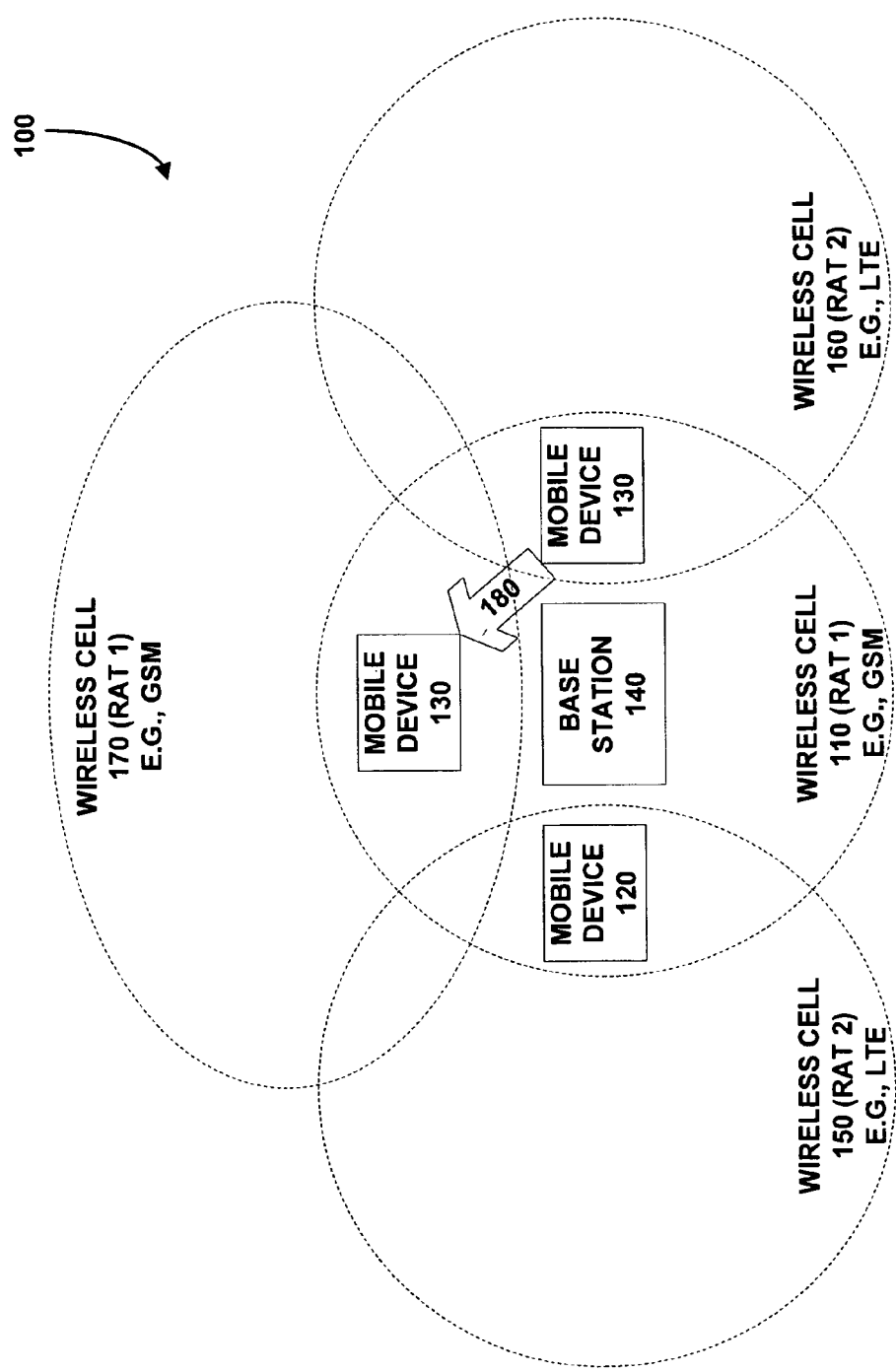
FIG. 1 is a block diagram of a wireless network according to an example embodiment.

FIG. 1 is a block diagram of a wireless network 100 according to an example embodiment. The network 100 includes a first wireless cell 110 that operates in accordance with a first radio access technology (RAT). For purposes of this illustration, the wireless cell 110 may operate in accordance with GSM or UMTS and support circuit-switched radio resource connections. As is known, in GSM, radio network access is provided in accordance with the GSM EDGE Radio Access Network (GERAN) standards. Thus, the first RAT may be in accordance with the GERAN (i.e., GSM) standards or the UMTS standards. It is noted that GSM and UMTS support circuit-switched only radio resource connections, packet-switched only radio resource connections and dual-mode (i.e., both packet and circuit switched) radio resource connections.

The network 100 may also include mobile devices 120 and 130. For purposes of this discussion, it is assumed that the mobile devices 120 and 130 are multi-mode devices and are compatible with GSM and/or UMTS and are also compatible with LTE. As shown in FIG. 1, the cell 110 includes a base station 140 that provides radio access capabilities for the mobile devices 120 and 130 in the cell 110.

The network 100 may further include wireless cells 150 and 160, which may operate in accordance with a second RAT. For purposes of this disclosure, the cells 150 and 160 are assumed to operate in accordance with the LTE (i.e., E-UTRAN or E-UTRA) standards and only provide for packet-switched connections. As shown, the cells 150 and 160 may overlap the cell 110 and be referred to as "neighboring cells" for the cell 110. The overlap shown between the cells 110, 150 and 160 in FIG. 1 is merely an example and other arrangements are possible. For instance, the cell 150 could also be generated by the base station 140 and cover, for instance, the same geographic area as cell 110 or, alternatively, an area that is concentric with the cell 110, among any number of other arrangements. In other embodiments, the cells 150 and 160 may be generated by respective base stations (not shown) and have any number of possible geographic relationships with the cell 110.

The network 100 may additionally include a wireless communication cell 170, which operates in accordance with the first RAT. Thus, in this example, the cells 110 and 170 may operate in accordance with GSM or UMTS. As an alternative, the cell 110 may operate in accordance with GSM while the cell 170 operates in accordance with UMTS, or vice versa.

As shown by arrow 180 in FIG. 1, the mobile device 130 may move under the coverage of cell 170 (e.g., while remaining within the cell 110 or moving outside the cell 110) and at some point be handed over (either autonomously or under control of the network) to the cell 170 from the cell 110. Such a hand over may occur when the mobile device 130 is actively communicating with the network (e.g., via a dedicated mode, radio resource connection) or when the mobile device 130 is operating in an idle mode (e.g., (packet) idle mode).

In the network 100, the measurement and reporting of signals received from the neighboring LTE cells 150 and 160 at the mobile devices 120 and 130 may be controlled by messages from the base station 140 in order to conserve battery power in the mobile device, conserve time for making signal measurements for signals from other neighboring cells (e.g., the cell 170) and conserve control channel bandwidth of the base station 140 for other activities, such as receiving measurement reports for signals from other neighboring cells, such as the cell 170. Techniques for controlling the measurement and reporting of neighboring cell signals will be described in further detail below with respect to the methods illustrated in FIGS. 4-6.

Figure 2:
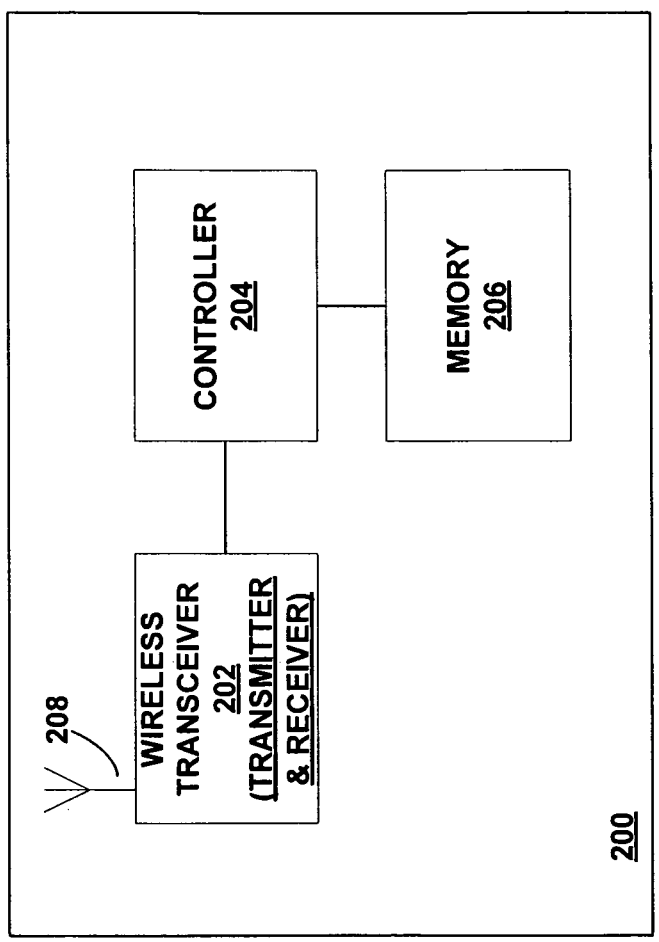
FIG. 2 is a block diagram of a wireless device according to an example embodiment.

FIG. 2 is a block diagram illustrating an embodiment of a wireless device 200 that may be used in the network 100. For instance, the wireless device 200 may be implemented as the mobile devices 120 and 130 or, alternatively, as the base station 140.

The wireless device 200 may include a wireless transceiver 202. The wireless transceiver may include a transmitter for transmitting radio frequency signals (e.g., via antenna 208) and a receiver for receiving wireless radio frequency signals (e.g., via antenna 208). The antenna 208 may be a broad spectrum antenna and the transceiver 202 may include respective narrow band transceivers for each of the carrier (channel) frequencies. In another example embodiment, the transceiver 202 may include a tunable narrow band transceiver that may be tuned to support each of the carrier frequencies. In yet another example embodiment, the antenna 208 may include respective individual narrow spectrum antennas in order to support the various carrier (channel) frequencies.

The wireless device 204 may also include a controller 204 for carrying out various functions of the wireless device 200. For instance, the controller may execute software instructions to implement the functions of the mobile devices 120 and 130 or, alternatively, the functions of the base station 140.

The wireless device 200 further includes a memory 206 that may be used to store data. For instance, the memory 206 may be used to store software instructions, signal measurements and/or measurements reports, among any number of other types of data used in the operation of the wireless device 200. While approaches for controlling measurement reporting and measurement of signals for neighboring cells are briefly described with respect to FIG. 2, as noted above, such techniques will be discussed in further detail below with respect to FIGS. 4-6.

When implementing the wireless device 200 as a mobile device (e.g., mobile devices 120 and 130), the controller 204 and the wireless transceiver 202 may be collectively configured to operate the wireless device as a mobile device in a first wireless communications cell, where the first wireless communication cell operates in accordance with a first radio access technology (RAT), e.g., GSM or UMTS. The controller 204 and transceiver 202 may collectively be further configured to receive (e.g., from a base station) information regarding one or more neighboring wireless communication cells operating in accordance with a second RAT, e.g., LTE (E-UTRAN).

The controller 204 and transceiver 202 may collectively be still further configured to establish an active communication channel with a base station in the first wireless communication cell and provide capability information of the mobile device to the base station, where the capability information includes an indication if the mobile device is compatible with the second RAT or an indication that the mobile device is compatible with the second RAT.

The controller 204 and transceiver 202 may collectively also be configured, in the event the mobile device is compatible with the second RAT, to receive, from the base station, instructions regarding whether or not to provide measurement reports for signals received at the mobile device from the one or more neighboring wireless communications cells.

When implementing the wireless device 200 as a base station (e.g., the base station 140), the controller 204 and the transceiver 202 may be collectively configured to operate a first wireless communication cell in accordance with a first radio access technology (RAT), e.g., GSM (GERAN) or UMTS. The controller 204 and the transceiver 202 may be collectively further configured to transmit, to one or more mobile devices in the first wireless communication cell, information regarding one or more neighboring wireless communication cells, where the one or more neighboring wireless communication cells are operated in accordance with a second RAT, e.g., LTE.

In such an embodiment, the controller 204 and the transceiver 202 may be collectively still further configured to establish an active communication channel in the first wireless communication cell with a mobile device of the one or more mobile devices, where the active communication channel is established in accordance with the first RAT. The controller 204 and the transceiver 202 may be collectively also configured to receive capability information for the mobile device, the capability information including an indication if the mobile device is compatible with the second RAT or an indication that the mobile device is compatible with the second RAT. The controller 204 and the transceiver 202 may be collectively further configured, in the event the mobile device is compatible with the second RAT, to provide instructions to the mobile device regarding whether or not to provide measurement reports for signals received from the one or more neighboring cells.

Figure 3:
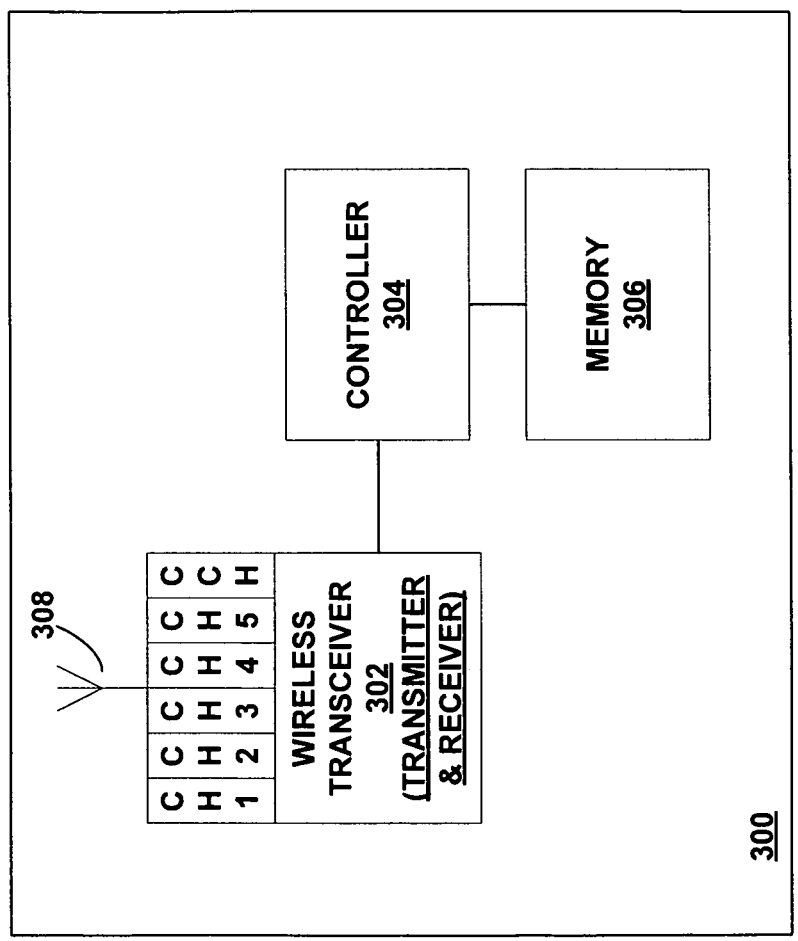
FIG. 3 is a block diagram of a wireless device according to another example embodiment.

FIG. 3 is a block diagram illustrating another example embodiment of a wireless device 300. In like fashion as the wireless device 200, the wireless device 300 includes a wireless transceiver 302, a controller 304, memory 306 and an antenna 308. For purposes of brevity, details of the controller 204, the memory 206 and the antenna 208 will not be described again in detail here with respect to the controller 304, the memory 306 and the antenna 308.

In the wireless device 300, the wireless transceiver 302 may support a plurality of carrier frequencies (channels). As shown in FIG. 3, the wireless transceiver may support Channels 1-5 (CH1-CH5) as well as a control channel (CCH). This is merely an example and any number and/or types of channels may be supported. Each of the channels of the transceiver 302 may be associated with a center frequency (e.g., carrier frequency) and may be referred to by an Absolute Radio Frequency Channel Number (ARFCN) and/or by an index to the ARFCNs. Such an index may be kept, for example, as a look-up table in the memory 306. An ARFCN for a channel may correspond with its center frequency while an index for a channel may correspond with its relative position in a sequence of (not necessarily contiguous) carrier frequencies. For instance, channel indices may be integer values with the lowest carrier frequency (ARFCN) having an index of "1", with each successive carrier frequency (ARFCN) having an index that is increased by "1" over the previous index. Thus, in such an approach, the indices would be sequential integer values respectively associated with sequentially increasing ARFCNs.

Figure 4:
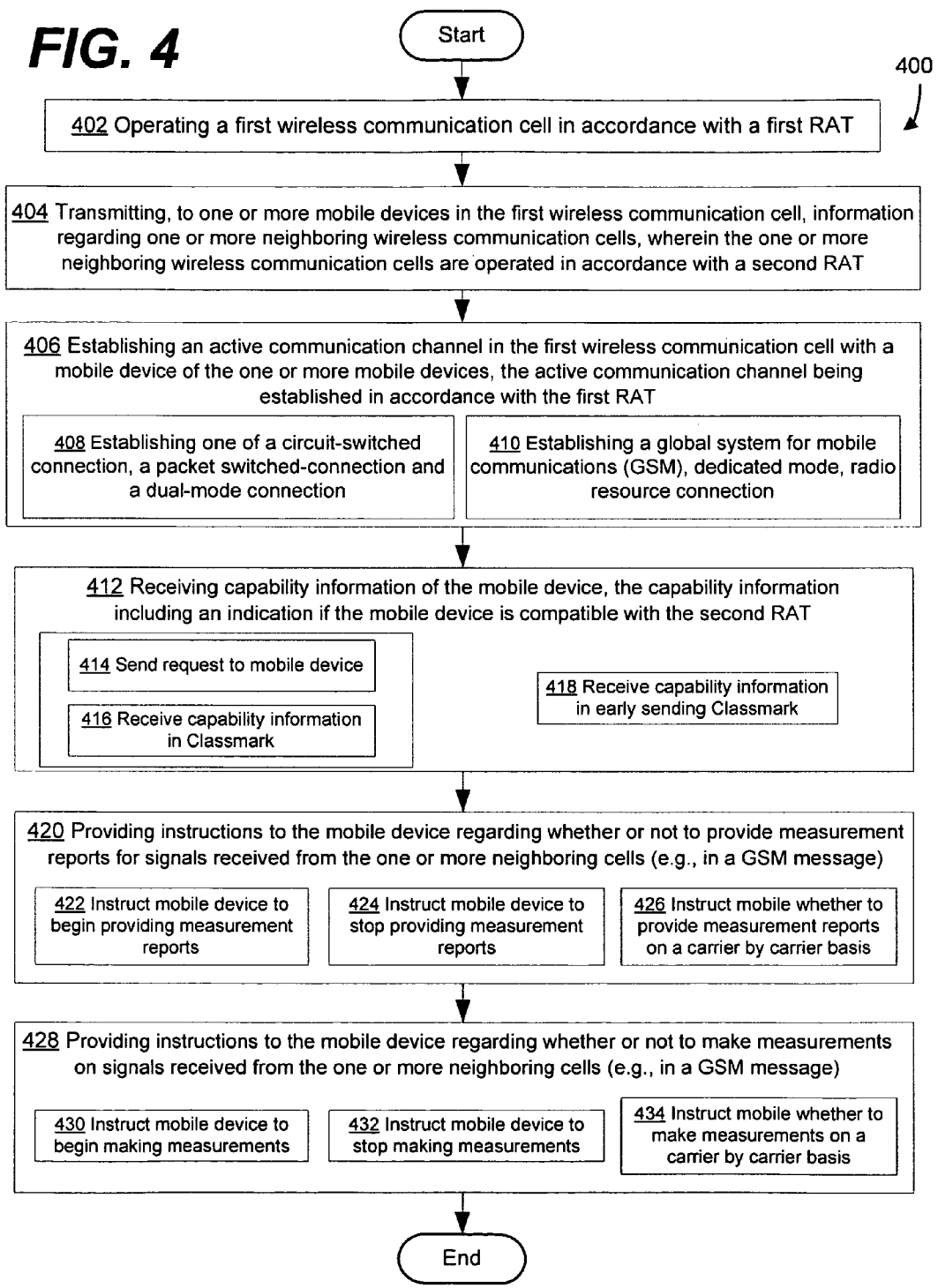
FIG. 4 is a flowchart showing a method according to an example embodiment.
Figure 5:
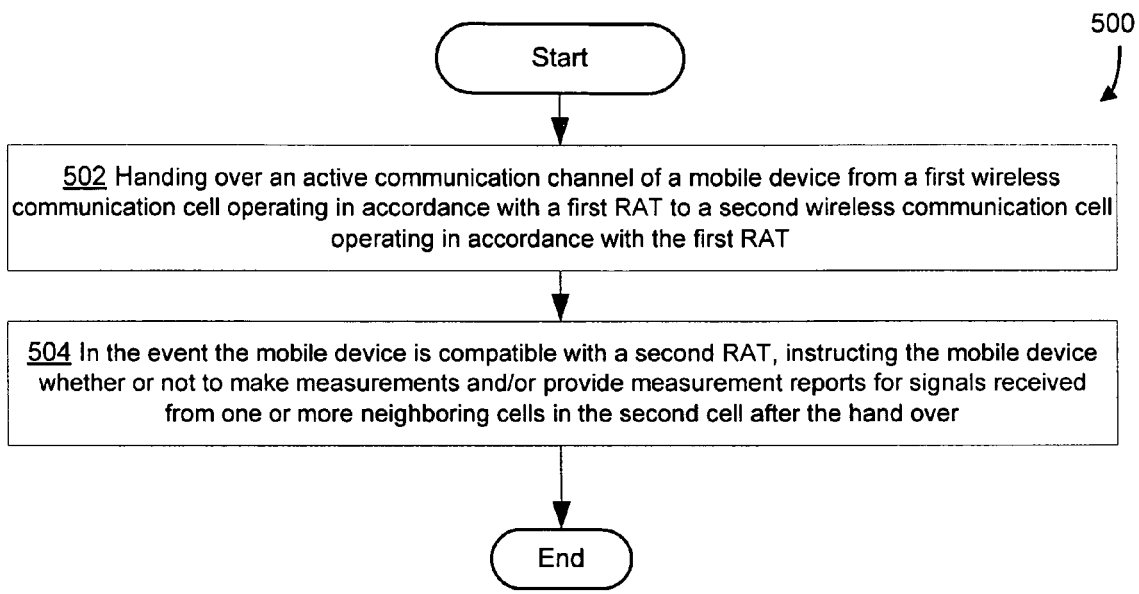
FIG. 5 is a flowchart showing a method according to another example embodiment.
Figure 6:
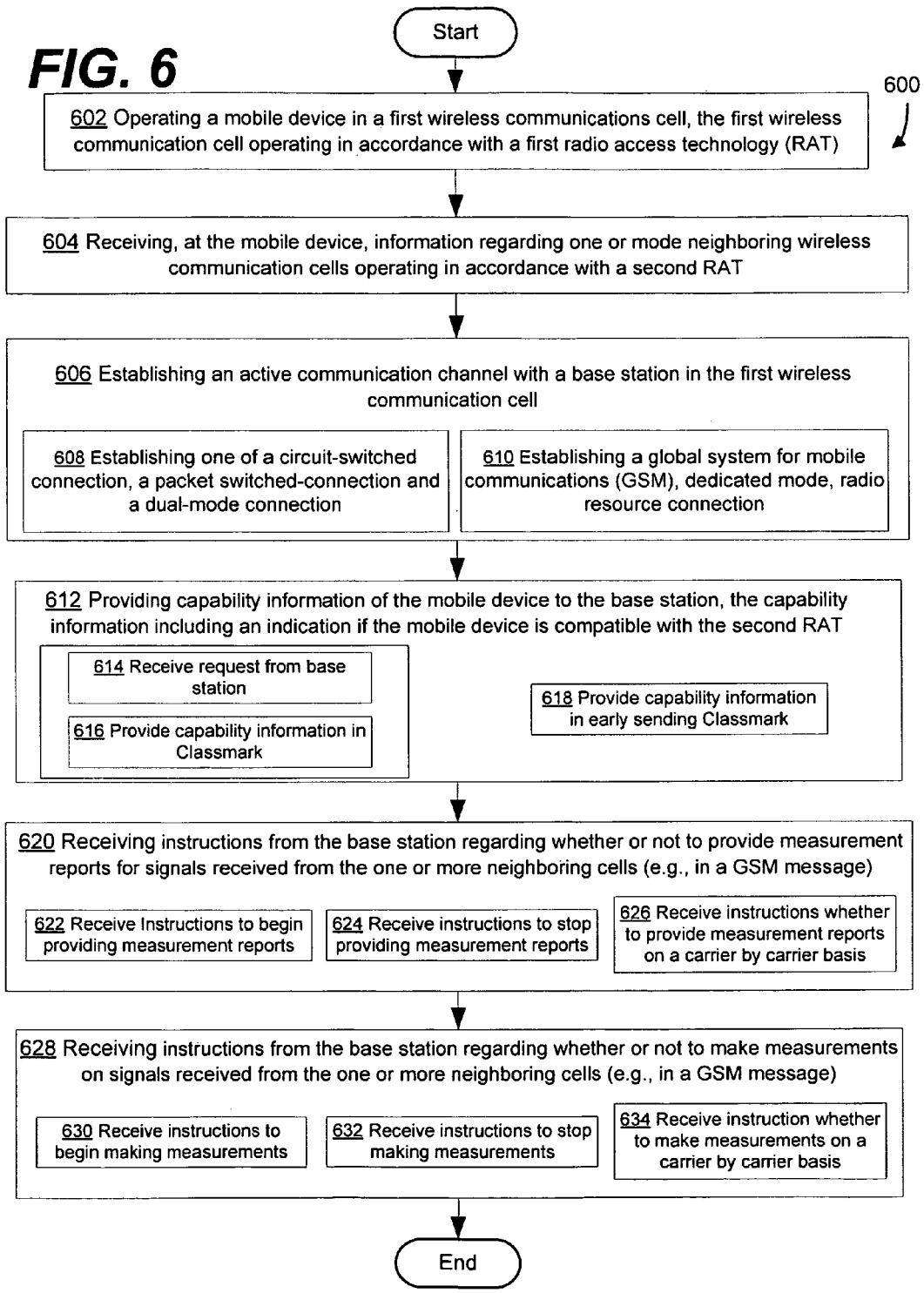
FIG. 6 is a flowchart showing a method according to yet another example embodiment.

FIG. 4 is a flowchart illustrating an example embodiment of a method 400 for measurement reporting and making associated measurements of wireless signals for neighboring cells in a wireless network. The method 400, as well as the methods 500 and 600 illustrated in FIGS. 5 and 6, are described below with further reference to FIGS. 1-3 for purposes of further illustration of the methods.

Method 400 includes, at block 402, operating a first wireless communication cell in accordance with a first radio access technology (RAT). The first wireless communication cell may, for example, be operated (implemented) as the cell 110 of FIG. 1 by the base station 140. The first RAT of the cell 110 may be a RAT that supports circuit-switched connections, such as GSM dedicated mode, radio resource connections, for example. The first RAT may also provide for packet-switched connections and dual-mode connections, as was previously discussed. In an example embodiment, the first RAT may operate in accordance with the Global System for Mobile communications (GSM) EDGE Radio Access Network (GERAN) telecommunications standards. In another example embodiment, the first RAT may operate in accordance with the Universal Mobile Telecommunications System (UMTS) standards. Of course, the first RAT may operate in accordance with any other number of standards or protocols.

At block 404, the method 400 includes transmitting, to one or more mobile devices, such as mobile devices 120 and 130, in the first wireless communication cell 110, information regarding one or more neighboring wireless communication cells, such as the cells 150 and 160. In the method 400, as in FIG. 1, the one or more neighboring wireless communication cells 150 and 160 are operated in accordance with a second RAT. In an example embodiment, the second RAT may only provide for packet-switched connections. For instance, the second RAT may operate in accordance with the Evolved Universal Mobile Telecommunications System (UMTS) Terrestrial Radio Access (E-UTRA) standards (i.e., the LTE or E-UTRAN standards).

In the method 400, at block 404, transmitting the information regarding the one or more neighboring wireless communication cells 150 and 160 may include broadcasting the information using a broadcast control channel in the first wireless communications cell, such as the control channel CCH illustrated and described above with respect to FIG. 3.

At block 406, the method 400 may include establishing, in the first wireless communication cell, an active communication channel with a mobile device, such as the mobile device 130, of the one or more mobile devices 120 and 130, where the active communication channel is established in accordance with the first RAT, e.g., GERAN or UMTS.

At block 408, establishing the active communication channel of block 406 may include establishing one of a circuit-switched connection, a packet switched-connection and a dual-mode connection in accordance with, for example, GERAN or UMTS. In an alternative example embodiment, for the method 400 at block 410, establishing the active communication channel of block 406 may include establishing, at block 410, a global system for mobile communications (GSM), dedicated mode, radio resource connection, i.e., a circuit-switched connection.

At block 412, the method 400 may include receiving capability information of the mobile device 130, where the capability information includes an indication if the mobile device 130 is compatible with the second RAT. In another example embodiment, the capability information may include an indication that the mobile device 130 is compatible with the second RAT. In an example embodiment, the capability information for the mobile device 130 may be included in a Mobile Station Classmark 3 Information Element. In another example embodiment, the capability information for the mobile device 130 may be included in an E-UTRAN Classmark. In yet another example embodiment, the capability information may be included in a Mobile Station Radio Access Capability Information Element.

Depending on the particular embodiment, the capability information may be received at block 416 of the method 400 in response to a request (a Classmark Enquiry message) sent at block 414 by the base station 140 to the mobile device 130. In another example embodiment, the mobile station 130 may send the capability information on its own initiative as part of an Early Classmark Sending process at block 418. In another example embodiment, the capability information for the mobile device 130 may be received from another network element, such as a base station included in a cell that is initiating a hand over request for the mobile station 130.

At block 420, if the mobile device 130 is compatible with the second RAT, the base station 140 may provide instructions to the mobile device 130 regarding whether or not the mobile device 130 should provide measurement reports for signals received from the one or more neighboring cells 150 and 160. At block 422, providing the instructions to the mobile device 130 as to whether or not to provide the measurement reports may include instructing the mobile device 130 to begin providing the measurement reports. At block 424, providing the instructions to the mobile device 130 as to whether or not to provide the measurement reports may include instructing the mobile device 130 to stop providing the measurement reports. At block 426, providing the instructions to the mobile device 130 as to whether or not to provide the measurement reports may include instructing the mobile device 130 whether or not to provide the measurement reports on a carrier by carrier basis for one or more carriers, such as CH1-CH5, of the one or more neighboring wireless communication cells 150 and 160.

At block 420 (and block 428, which is discussed below) instructions may be provided in one or more existing control channel message formats (such as GSM, UMTS or LTE control messages). Such messages may include a HANDOVER COMMAND message, a DTM HANDOVER COMMAND message, a PS HANDOVER COMMAND message, a PACKET CELL CHANGE ORDER message, a FREQUENCY REDEFINITION message, a PHYSICAL INFORMATION message, a PACKET PHYSICAL INFORMATION message, a MEASUREMENT INFORMATION message, a MEASUREMENT ORDER message, a PACKET MEASUREMENT ORDER message, an EXTENDED MEASUREMENT ORDER message, an ASSIGNMENT COMMAND message, a PACKET UPLINK ASSIGNMENT message, a MULTIPLE TBF UPLINK ASSIGNMENT message, a PACKET DOWNLINK ASSIGNMENT message, a MULTIPLE TBF DOWNLINK ASSIGNMENT message, a PACKET TIMESLOT RECONFIGURE message, a MULTIPLE TBF TIMESLOT RECONFIGURE message, a PACKET CS COMMAND message, and a PACKET CS RELEASE INDICATION messages. In another example embodiment, the instructions may be provided in a specific (or dedicated) signal measurement and measurement reporting control message, for example. Example embodiments of providing such instructions will be discussed in further detail below.

At block 428, the method 400 may include, in the event the mobile device 130 is compatible with the second RAT, providing instructions to the mobile device 130 regarding whether or not to make measurements on signals received from the one or more neighboring cells 150 and 160. As with the instructions provided at block 420, the instructions provided at block 428 may be included in an existing control channel message format for the wireless communication cell 110, or in a dedicated signal measurement and reporting control message.

At block 430, providing the instructions to the mobile device 130 regarding whether or not to make the measurements may include instructing the mobile device 130 to begin making the measurements. At block 432, providing the instructions to the mobile device 130 regarding whether or not to make the measurements may include instructing the mobile device 130 to stop making the measurements. At block 434, providing the instructions to the mobile device 130 regarding whether or not to make the measurements may include instructing the mobile device 130 whether or not to make the measurements on a carrier by carrier basis for one or more carriers of the one or more neighboring wireless communication cells 150 and 160. As was discussed with respect to FIG. 3, the carriers may be identified (e.g., in the instructions and/or control message) using respective ARFCNs for the carriers or, as an alternative, the carriers may be identified using respective indices for the carriers.

Using the above approaches, signal measurements and measurement reporting may be turned on or off for signals received from neighboring cells where facilities for handing over a mobile device 130 from a cell of one RAT (a first RAT) to a cell of another RAT (a second RAT) may not be available. Alternatively, signal measurements and measurement reporting may be turned on or off on a carrier by carrier basis for signals received from neighboring cells where facilities for handing over a mobile device 130 from a cell using the first RAT to a cell using the second RAT may be limited, e.g., limited to certain carrier frequencies. Such approaches may allow for conservation of mobile device battery power by reducing the number of signal measurements being made, free up time for the mobile device to make signal measurements for signals from other cells and also may reduce the amount of control channel bandwidth used for measurement reporting, thus freeing up bandwidth for other network control messages, such as other measurement reports.

As discussed above, the instructions at blocks 420 and 428 of the method 400 may be included in an existing control channel message or in a dedicated message, as two examples. In an example embodiment, these instructions may take the form of an instruction code included in an existing control channel message or in a dedicated message. For instance, at block 422, transmitting an instruction code of '1' to a mobile device may indicate that the mobile device is to begin providing measurement reports for cells implemented using the second RAT. At block 424, an instruction code of '0' may indicate that the mobile device is to stop providing measurement reports for cells operating in accordance with the second RAT.

In another example embodiment, the instructions for blocks 422, 424, 430 and 432 may be made using two bit control codes. For instance, a control code of '00' may indicate that signal measurements for RAT 2 cells should not, or shall not be made (block 432) and measurement reports shall not be provided (block 424) for those RAT 2 cells. A control code of '01' may indicate that signal measurements for the neighboring RAT 2 cells shall be made (block 430) but measurement reports shall not be sent (block 424). Further, a control code of '11' may indicate that signal measurements for neighboring RAT 2 cells shall be made (block 430) and that measurement reports based on those measurements shall be provided (block 422). Signal measurement and measurement reporting instructions may be made on a carrier by carrier basis (for blocks 426 and 434) by including a list of ARFCNs or indices to ARFCNs along with any of the control codes described above. Of course, other approaches for providing such instructions on a cell by cell basis or a carrier by carrier basis are possible.

FIG. 5 is a flowchart illustrating another example embodiment of a method 500 for measurement reporting and measurement of signals for neighboring cells in a wireless network where a mobile device is operating in a first cell implemented using a first RAT and a neighboring cell is implemented using a second RAT. In similar fashion as discussed above, for this example embodiment, facilities for hand over between the two cells (i.e., between the first RAT and the second RAT) may be limited or not available. In the method 500, instructions may be provided to a target cell as part of a hand over process as whether or not to make signal measurements or provide measurement reports for the neighboring cell's or cells' signals after completing the hand over. A target cell in a hand over process is a cell to which a mobile device is being transferred to for continuity of radio network access. For example, in FIG. 1, when the mobile device 130 moves, as indicated by the arrow 180, from being serviced by the cell 110 to being serviced by the cell 170, the cell 170 is the target cell for the handover of the mobile device 130.

At block 502, the method 500 includes handing over an active communication channel (e.g., associated with the mobile device 130) from a first wireless communication cell (e.g., the cell 110) operating in accordance with a first RAT to a second wireless communication cell (e.g., the target cell 170) operating in accordance with the first RAT. In this example embodiment, the mobile device 130 may have previously provided the base station 140 with capability information for the mobile device 130 in, for example, a Mobile Station Classmark 3 Information Element or a E-UTRAN Classmark, such as discussed above. In another example embodiment, the cell 170 may operate in accordance with a third RAT, e.g., UMTS.

At block 504, in the event the mobile device 130 is compatible with the second RAT, the method 500 may include instructing the mobile device 130 whether or not to provide measurement reports in the second cell (after the hand over) for signals received from one or more neighboring cells 150 and 160 operating according to the second RAT. In another embodiment, instructions regarding whether or not to make signal measurements for the signals may also be provided. In yet another embodiment, instructions regarding making signal measurements and providing measurement reports in the target cell may be made on a carrier by carrier basis. The instructions in such embodiments may be provided in any of the fashions described above, or in any other appropriate manner.

FIG. 6 is a flowchart illustrating yet another example embodiment of a method 600 for measurement reporting and measurement of signals for neighboring cells in a wireless network. The method 600 is similar to the method 400 illustrated in FIG. 4, but as viewed from the perspective of a mobile device, rather than the perspective of a wireless network entity, such as a base station. Accordingly, the various techniques discussed above for providing neighboring cell information, establishing an active communication channel, providing capability information, providing instructions regarding making signal measurements and providing instructions regarding providing measurement reports apply in like fashion to the method 600 and, for brevity and clarity, will not be described in detail again here.

At block 602, the method 600 may include operating a mobile device, such as mobile device 130, in a first wireless communications cell, such as the cell 110. In the method 600, the first wireless communication cell may operate in accordance with a first RAT. As with the method 400, for the example method 600, the first RAT may provide for circuit-switched only connections. For instance the first RAT may operate in accordance with the Global System for Mobile communications (GSM) EDGE Radio Access Network (GE-RAN) standards. In another example embodiment, the first RAT may operate in accordance with the Universal Mobile Telecommunications System (UMTS) standards.

At block 604, the method 600 may include receiving, at the mobile device 130, information regarding one or more neighboring wireless communication cells, such as the cells 150 and 160. In the method 600, the cells 150 and 160 may operate in accordance with a second RAT. Also for the method 600, the second RAT may only provide for packet-switched connections in like fashion as the method 400. For instance, the second RAT may operate in accordance with the LTE (E-UTRA or E-UTRAN) standards.

At block 606, the method 600 may include establishing an active communication channel with a base station, such as the base station 140, in the first wireless communication cell 110. In similar fashion as the method 400, at block 608, the method 600 may include establishing one of a circuit-switched connection, a packet switched-connection and a dual-transfer mode connection. Also in similar fashion as the method 400, at block 610, the method 600 may, as one alternative, include establishing a global system for mobile communications (GSM), dedicated mode, radio resource connection.

At block 612, in similar fashion as block 412 of FIG. 4, the method 600 includes providing capability information of the mobile device 130 to the base station 140. In this embodiment, the capability information may include an indication if the mobile device 130 is compatible with the second RAT or, alternatively, may include an indication that the mobile device 130 is not compatible with the second RAT. Providing the capability information at block 612 may include, at block 614, receiving a request from the base station 140, such in the form of a Classmark Enquiry message. The method 600 may include, at block 616, providing the capability information in a Classmark, such as a Mobile Station Classmark 3 or an E-UTRAN Classmark. In an example embodiment, the capability information may be alternatively provided, at block 618, in a Classmark as part of an early Classmark sending process, as was previously discussed. In other example embodiments, the capability information may be provided by other network elements, as was also discussed above.

At block 620, in the event the mobile device is compatible with the second RAT, the method 600 may include receiving instructions from the base station 140 regarding whether or not to provide measurement reports for signals received at the mobile device 130 from the one or more neighboring wireless communications cells 150 and 160. At block 628, the method 600 may include receiving instructions regarding whether or not to make measurements on the signals received from the one or more neighboring wireless communications cells 150 and 160. In like fashion as with the blocks 422, 424, 426, 430, 432 and 434 of the method 400, providing the instructions to the mobile device 130 at blocks 622, 624, 626, 630, 632 and 634 of the method may be accomplished in similar fashion as discussed above with respect to FIG. 4, such by using control codes, ARFCNs and/or indices to the ARFCNs. For the sake of brevity, those techniques will not be described in detail again with respect FIG. 6.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method comprising:
    operating a first wireless communication cell in accordance with a first radio access technology (RAT);
    transmitting, to one or more mobile devices in the first wireless communication cell, information regarding one or more neighboring wireless communication cells, wherein the one or more neighboring wireless communication cells are operated in accordance with a second RAT;
    establishing an active communication channel in the first wireless communication cell with a given mobile device of the one or more mobile devices;
    sending a request to the given mobile device for capability information;
    receiving, from the given mobile device, the capability information for the given mobile device, the capability information including an indication if the given mobile device is compatible with the second RAT;
    in the event the capability information indicates that the given mobile device is compatible with the second RAT, providing instructions to the given mobile device regarding whether or not to make measurements on signals received from the one or more neighboring wireless communication cells; and
    in the event the capability information indicates that the given mobile device is compatible with the second RAT, providing instructions to the given mobile device regarding whether or not to provide measurement reports on the signals received from the one or more neighboring wireless communication cells,
    wherein the capability information is included in an information element selected from the group consisting of a Mobile Station Classmark 3 Information Element, an E-UTRAN Classmark, and a Mobile Station Radio Access Capability Information Element,
    handing over the active communication channel from the first wireless communication cell to a second wireless communication cell operating in accordance with the first RAT; and
    in the event the given mobile device is compatible with the second RAT, instructing the given mobile device whether or not to provide the measurement reports for the signals received from one or more neighboring wireless communication cells in the second wireless communication cell after the hand over.

2. The method of claim 1, wherein providing instructions to the given mobile device regarding whether or not to make the measurements includes instructing the given mobile device to begin making the measurements.

3. The method of claim 1, wherein providing instructions to the given mobile device regarding whether or not to make the measurements includes instructing the given mobile device to stop making the measurements.

4. The method of claim 1, wherein providing instructions to the given mobile device regarding whether or not to make the measurements includes instructing the given mobile device whether or not to make the measurements on a carrier by carrier basis for one or more carriers of the one or more neighboring wireless communication cells.

5. The method of claim 1, wherein providing instructions to the given mobile device regarding whether or not to provide the measurement reports includes instructing the given mobile device to begin providing the measurement reports.

6. The method of claim 1, wherein providing instructions to the given mobile device regarding whether or not to provide the measurement reports includes instructing the given mobile device to stop providing the measurement reports.

7. The method of claim 1, wherein providing instructions to the given mobile device regarding whether or not to provide the measurement reports includes instructing the given mobile device whether or not to provide the measurement reports on a carrier by carrier basis for one or more carriers of the one or more neighboring wireless communication cells.

8. The method of claim 1, wherein the first RAT provides for circuit-switched connections and the second RAT only provides for packet-switched connections.

9. The method of claim 1, further comprising:
    handing over the active communication channel from the first wireless communication cell or the second wireless communication cell to a third wireless communication cell operating in accordance with a third RAT; and
    in the event the given mobile device is compatible with the second RAT, instructing the given mobile device whether or not to provide the measurement reports for the signals received from one or more neighboring wireless communication cells in the third wireless communication cell after the hand over.

10. The method of claim 1, wherein transmitting the information regarding one or more neighboring wireless communication cells comprises broadcasting the information using a broadcast control channel in the first wireless communications cell.

11. A method comprising:
    operating a mobile device in a first wireless communications cell, the first wireless communication cell operating in accordance with a first radio access technology (RAT);
    receiving, at the mobile device, information regarding one or more neighboring wireless communication cells operating in accordance with a second RAT;
    establishing an active communication channel with a base station in the first wireless communication cell;
    receiving, from the base station, a request for capability information; providing the capability information for the mobile device from the mobile device to the base station, the capability information including an indication if the mobile device is compatible with the second RAT;
    in the event the capability information indicates that the mobile device is compatible with the second RAT, receiving, from the base station, instructions regarding whether or not to make measurements on the signals received from the one or more neighboring wireless communications cells; and
    in the event the capability information indicates that the mobile device is compatible with the second RAT, receiving, from the base station, instructions regarding whether or not to provide measurement reports on the signals received at the mobile device from the one or more neighboring wireless communications cells,
    wherein the capability information is included in an information element selected from the group consisting of a Mobile Station Classmark 3 Information Element, an E-UTRAN Classmark, and a Mobile Station Radio Access Capability Information Element,
    after the active communication channel is handed over from the first wireless communication cell to a second wireless communication cell, operating in accordance with the first RAT; and
    in the event the given mobile device is compatible with the second RAT, receiving, from the base station or another base station, instructions regarding whether or not to provide the measurement reports for the signals received from one or more neighboring wireless communication cells in the second wireless communication cell after the hand over.

12. The method of claim 11, wherein the instructions regarding whether or not to make the measurements include one or more instructions instructing the mobile device whether or not to make the measurements on a carrier by carrier basis for one or more carriers of the one or more neighboring wireless communication cells.

13. The method of claim 11, wherein the instructions regarding whether or not to provide the measurement reports include one or more instructions instructing the mobile device whether or not to provide the measurement reports on a carrier by carrier basis for one or more carriers for the neighboring wireless communication cells.

14. The method of claim 13, wherein instructing the mobile device on a carrier by carrier basis comprises providing one or more absolute radio frequency channel numbers (ARFCNs) with the one or more instructions, the one or more ARFCNs corresponding with respective carriers of the neighboring wireless communication cells.

15. The method of claim 13, wherein instructing the mobile device on a carrier by carrier basis comprises providing one or more indices to respective absolute radio frequency channel numbers (ARFCNs) with the one or more instructions, the one or more ARFCNs corresponding with respective carriers of the one more neighboring wireless communication cells.

16. The method of claim 11, wherein the first RAT provides for circuit-switched connections and the second RAT only provides for packet-switched connections.

17. An apparatus for wireless communication, the apparatus comprising:
    a controller; and
    a wireless transceiver coupled with the controller, wherein the controller and wireless transceiver are collectively configured to:
    operate a first wireless communication cell in accordance with a first radio access technology (RAT);
    transmit, to one or more mobile devices in the first wireless communication cell, information regarding one or more neighboring wireless communication cells, wherein the one or more neighboring wireless communication cells are operated in accordance with a second RAT;
    establish an active communication channel in the first wireless communication cell with a given mobile device of the one or more mobile devices;
    transmit, to the given mobile device, a request for capability information; receive, from the given mobile device, the capability information for the given mobile device, the capability information including an indication if the given mobile device is compatible with the second RAT;
    in the event the capability information indicates that the given mobile device is compatible with the second RAT, provide instructions to the given mobile device regarding whether or not to make measurements on the signals received from the one or more neighboring wireless communications cells; and
    in the event the capability information indicates that the given mobile device is compatible with the second RAT, provide instructions to the given mobile device regarding whether or not to provide measurement reports on the signals received from the one or more neighboring wireless communication cells,
    wherein the capability information is included in an information element selected from the group consisting of a Mobile Station Classmark 3 Information Element, an E-UTRAN Classmark, and a Mobile Station Radio Access Capability Information Element,
    handing over the active communication channel from the first wireless communication cell to a second wireless communication cell operating in accordance with the first RAT; and
    in the event the given mobile device is compatible with the second RAT, instructing the given mobile device whether or not to provide the measurement reports for the signals received from one or more neighboring wireless communication cells in the second wireless communication cell after the hand over.

18. An apparatus comprising:

a controller; and a wireless transceiver coupled with the controller, wherein the controller and the wireless transceiver are collectively configured to:

operate the apparatus as a mobile device in a first wireless communications cell, the first wireless communication cell operating in accordance with a first radio access technology (RAT);

receive information regarding one or more neighboring wireless communication cells operating in accordance with a second RAT;

establish an active communication channel with a base station in the first wireless communication cell;

receive, from the base station, a request for capability information;

provide the capability information for the mobile device to the base station, the capability information including an indication if the mobile device is compatible with the second RAT;

in the event the capability information indicates that the mobile device is compatible with the second RAT, receive, from the base station, instructions regarding whether or not to make measurements on the signals received from the one or more neighboring wireless communications cells; and in the event the capability information indicates that the mobile device is compatible with the second RAT, receive, from the base station, instructions regarding whether or not to provide measurement reports on the signals received at the mobile device from the one or more neighboring wireless communications cells, wherein the capability information is included in an information element selected from the group consisting of a Mobile Station Classmark 3 Information Element, an E-UTRAN Classmark, and a Mobile Station Radio Access Capability Information Element, after the active communication channel is handed over from the first wireless communication cell to a second wireless communication cell, operate in accordance with the first RAT; and in the event the given mobile device is compatible with the second RAT, receive, from the base station or another base station, instructions regarding whether or not to provide the measurement reports for the signals received from one or more neighboring wireless communication cells in the second wireless communication cell after the hand over.

\* \* \* \* \*